Oct. 20, 1942.   A. BERENY   2,299,074
CONTROL VALVE
Filed Sept. 27, 1940
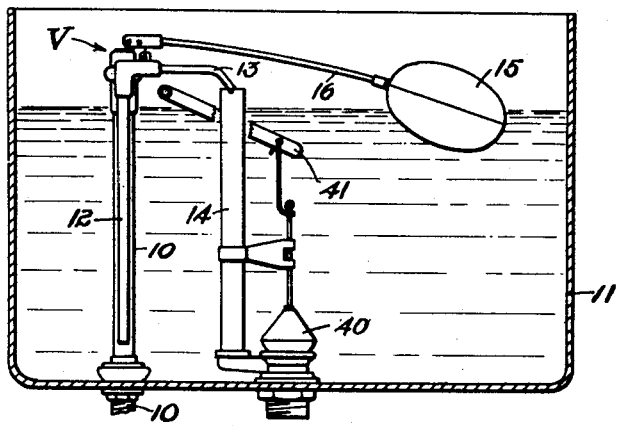
Fig.1
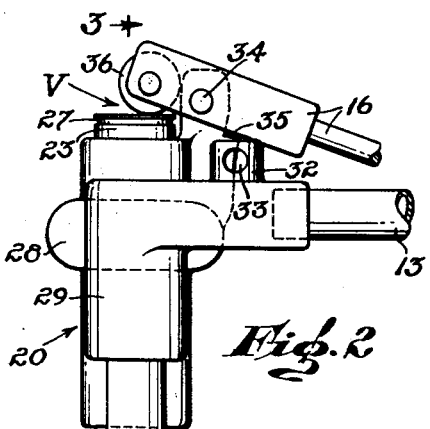
Fig.2
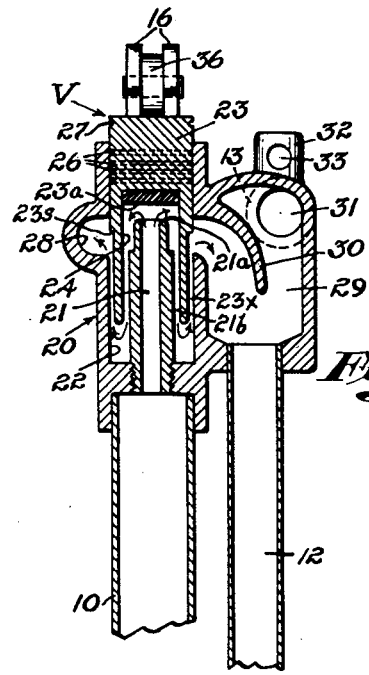
Fig.3
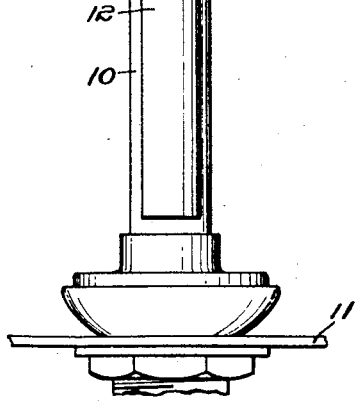
INVENTOR.
Alexander Bereny
BY
ATTORNEY.

Patented Oct. 20, 1942

2,299,074

UNITED STATES PATENT OFFICE 2,299,074

CONTROL VALVE

Alexander Bereny, North Hollywood, Calif., assignor to John H. Armstrong, Los Angeles, Calif.

Application September 27, 1940, Serial No. 358,688

2 Claims. (Cl. 137—104)

This invention relates to improvements in tanks for water closets and the like, particularly to the float operated valve and its associated fittings.

The usual float operated valve in tanks of this nature includes a pivoted arm carrying a float which actuates the arm to gradually close the valve as the level of the water in the tank rises. Such slow closing as is normally caused by the gradual rise of the water in the tank causes a progressive constriction of the water passages in the valve. Such constriction almost inevitably causes an objectionable hissing noise in some stage of such constriction. Ordinances require that tanks of this nature have some means for breaking the siphon between the tank and the water supply when the valve is shut to prevent siphoning of water in the tank back into the public water supply system. Such siphon breakers as used in the past have a tendency to admit air into the flowing water when the valve is open during refilling of the tank, which passage of air also creates an objectionable hissing or whistling noise.

Because of these two major defects in the present type of valve used in this connection, it becomes a primary object of the present invention to provide a valve capable of operation by a float which is silent in all stages of operation.

It is a further object of this invention to provide a valve which tends to remain relatively widely open and to close suddenly rather than gradually.

It is a further object of this invention to provide a valve of this nature which permits flow only through the passages which are intended to convey flowing water and which does not leak when open.

It is a further object of this invention to provide a valve which will prevent siphoning of the contents of the tank into the water supply.

It is a further object of this invention to provide a float regulated valve which is capable of operation under a wide variety of supply pressures.

This invention possesses many other advantages and has other objects which may be made more easily apparent from a consideration of one embodiment of the invention. For this purpose there is shown a form in the drawing accompanying and forming part of the present specification. This form will now be described in detail, illustrating the general principles of the invention; but it is to be understood that this detailed description is not to be taken in a limiting sense, since the scope of the invention is best defined by the appended claims.

Referring to the drawing:

Figure 1 is a section through a water closet tank with the water control system embodying my invention shown therein in elevation;

Figure 2 is an enlarged elevational view of the valve in completely open condition; and Figure 3 is a sectional view of the valve shown in Figure 2 in the same position of operation, said section being taken on line 3—3 of Figure 2.

In Figure 1 a stand pipe 10 connected with the water supply system extends upwardly through the bottom of a tank 11. At the upper end of the stand pipe 10 is a valve, generally designated V, which constitutes the present invention. The water rising in the stand pipe 10 is intended to flow down the tube 12 and discharge into the tank beneath the surface of the water therein to eliminate splashing noises while the tank is being refilled. Water is also intended to flow through a tube 13 and thence down pipe 14 to the closet to insure refilling of the trap of the closet while the tank is being refilled. The valve assembly at the upper end of the stand pipe 10 is controlled by a float 15 secured to an arm 16 which pivots on the valve body in response to rising of the level of the water in the tank.

Referring to Figures 2 and 3, the valve V comprises a body portion 20 having openings therein for the reception of the above mentioned tubes 10, 12, and 13 in a manner to be hereinafter described. Immediately above the opening for tube 10 is a nozzle 21 threaded into the body 20 in such a position that water may flow up the stand pipe 10 through the nozzle 21. This nozzle 21 may have a non-circular portion to enable its ready insertion in the body 20. Immediately surrounding and above the nozzle 21 the body 20 of the valve is formed with a bore 22. A plunger 23 having a bore 24 therein is slidingly mounted in the bore 22. This plunger 23 has a washer 23a within its bore in such a position that the washer 23a seats on the seat 21a of the nozzle 21 upon downward movement of the plunger 23.

This plunger has its lower portion reduced in diameter so that the bore 22 of the body 20 is cleared by the lower portion of the plunger 23 while the upper portion of the plunger forms a sliding fit with the bore 22. Also, owing to the reduced diameter of the lower portion of the plunger, an external annular shoulder 23s is produced therearound which at all times vertically overhangs the external annular channel 23x between the diametrically reduced part of said plunger and the surrounding wall of the bore in the body 20. Between the nozzle 21 and the bored out part of the plunger 23 is an internal annular channel 21b which always communicates with said channel 23x. When the washer 23a comes into contact with the seat 21a, said annular shoulder 23s approximately closes the mouth of the external annular channel 23x which surrounds the lower portion of the plunger. Therefore as the valve member approaches its closed position upward liquid pressure against said annular shoulder, produced by the sleeve-shaped current passing directly upward from said channel, adds to the effect of upward liquid pressure against the washer 23a of the valve member and thus by additionally opposing the action of the float 15 causes the float, when it finally acts to close the valve, to hold the valve closed under a greater pressure, which more effectually safeguards against leakage. Also, the pressure against said annular shoulder causes the float to complete the closing of the valve with a quick snap action, which is a desirable feature in devices of this kind. This upper portion of the plunger 23 has annular grooves 26 therein in its length and a single groove 27 closely adjacent its upper end. The grooves 26 are intended to be filled with grease or lubricant, and when so filled form a water tight seal to prevent the flow of liquid up between the bore 22 and the body of the plunger 23. This type of seal is satisfactory due to the low pressure which causes flow in that direction, for there is no flow except when the valve is open. It has been found that grease tends to form a slime with the water and does not have to be renewed for extremely long periods of time. This single groove 27 at the upper end of the plunger 23 is intended to assist in removing the plunger from the body in case of necessity, for without such groove it is impossible to remove the plunger without disassembly of the valve body from the plumbing fixtures to which it is connected. It will be observed that there is ample clearance between the outer surface of the nozzle 21 and the walls of the bore 24 of the plunger 23 to permit downward flow of the water discharged from the nozzle. Due to the reduced outside diameter of the plunger 23 at its lower portion, water may flow around the lower end of the plunger and upwardly through the annular passage defined between its reduced portion and the bore 22 of the body 20. Surrounding the plunger 23 is an annular chamber 28 for the reception and passage of the water flowing up the above mentioned space between the plunger and the body of the valve. This annular chamber is in communication with a second chamber 29. As will be observed in Figure 3, this chamber 29 contains a baffle or partition 30 pointing generally downwardly, and positioned to direct the water from the annular chamber 28 into the chamber 29. The lower end of the chamber 29 is connected to the tube 12 so that water may flow from the chamber 29 down the tube 12 to refill the tank 11, the discharge end of the tube being near the bottom of the tank so that such filling will be noiseless. Also in communication with the chamber 29 is the outlet 31 which is on the opposite side of the partition 30 from the annular chamber 28 and communicates with the refill tube 13 mentioned above. Mounted on top of the outlet 31 is a siphon breaker cap 32 having a plurality of holes 33 the aggregate area of which is preferably equal to or greater than the cross-sectional area of the tube 13.

In order to actuate the plunger 23, the lever 16 is pivoted to the body 20 by means of a cotter pin or other suitable removable fastener 34. A shoulder 35 is provided on the body for engaging the lever 16 to prevent the lever from dropping so far as to free the plunger 23, which would permit the water pressure to force it completely out of the body 20, the extension of said body which carries said shoulder being observable in Fig. 2 through the alined openings 33. This lever 16 preferably has on one end thereof a roller 36 engaging the upper surface of the plunger 23 to promote ready movement of the plunger 23 and reduce friction. The opposite end of the lever 16 carries the float 15 which moves the lever in response to the level of water in the tank 11 to operate the valve. This completes the description of the parts of the tank with which this invention is particularly concerned. The usual discharge means are provided including the rubber float valve 40 connected with the manually operable lever 41.

In operation, assuming that the valve V is in closed position as shown in Figure 1, raising the rubber float valve 40 will cause the level of water in the tank 11 to fall and thus cause float 15 to fall, raising the pivoted end of the lever. The pressure of the water in the supply pipe 10 will immediately lift the plunger 23, thus permitting water to flow past the valve seat 21a, downwardly between the plunger bore and the nozzle, upwardly between the bore 22 and annular reduced portion of the plunger into the annular chamber 28, and thence through the pipes 12 and 13 discharging into the tank 11 and pipe 14, respectively. The partition 30 prevents too rapid a flow through pipe 13 and also prevents water from squirting out through the siphon breaker cap openings 33. As the level of the water in the tank rises the float 15 also rises, pressing the lever roller 36 against the top of the plunger 23. However, the plunger 23 does not immediately close as the pressure of water impinging thereon holds the plunger up against the downward pressure of the roller 36. This continues as the tank fills while the float is pressed under water a sufficient amount to overcome the pressure exerted by the impact of the water flowing through the nozzle 21 and the plunger is forced down against this impact pressure. The decrease in the distance between the valve seat 21a and the washer 23a causes a decrease in the total cross-sectional discharge area in a direction perpendicular to the surface of the washer 23a. By the well known laws of continuity of flow and Bernoulli's theorems a decrease in the cross-sectional area at a point in a conduit system causes a decrease in the pressure of the fluid at that point. This decrease in pressure causes a decrease in the force necessary to move the plunger downwardly. Practically, the effect is that the plunger during the first stages of its travel moves with considerable resistance, thus holding the float with a considerable portion submerged. However, once the distance between the seat and the washer reaches a certain value the force necessary to move the plunger undergoes a rather sudden decrease. Because of this decrease the float rises rapidly through the water and causes the valve to be completely closed. In operation, the effect is almost that of a snap action valve. This snap action is greatly enhanced by the use of roller 36 and any other method of decreasing friction hindering motion of the valve parts. Such reduction in friction results in the forces generated by the flowing water being the most conspicuous and therefore of most effect on the action of the valve. Such snap action can be achieved only if there is not too much fluid friction in the valve and discharge system. It is for this reason that considerable clearance is provided between the nozzle and the bore of the plunger and between the plunger and the bore of the valve body. This snap action prevents entirely any hissing or whistling caused by flow of fluid through restricted passages, for any restriction sufficient to lower the pressure sufficiently to cause a hissing automatically closes the valve, for such hissing does not occur until the pressure in the fluid falls to a very low value at the point of restriction.

As was mentioned above, it is desirable to prevent noise caused by air rushing in the vacuum breaker openings 33. This noiseless operation is achieved by the presence of the baffle in the chamber. The baffle prevents the flow through the tube 13 from being any but the most gradual, and thus that flow does not achieve sufficient velocity to cause an inrush of air through the breaker holes 33.

Owing to the fact that the aperture 33 of the anti-syphon passage communicates with an intermediate part of a conduit structure end portions of which are formed by the conduits 12 and 13, and that said aperture is located at a higher level than any part of the liquid flow which takes place through said conduit structure at a flushing operation, even if an abortive flushing operation takes place lowering the water in the tank to a level between the passages 31 and 33 at a time when the water supply to the tank has been cut off, no water can be syphoned from the tank into the pipes of the supply system. Also, if the water is at a level between the conduit 31 and the aperture 33, no syphoning can, under the circumstances just stated, take place through the refill tube 13. A further resulting advantage of this arrangement is that the tank may safely be maintained more nearly filled than would otherwise be possible, even if there were not present a valve closure member capable of gravitating to its seat. In the illustrated embodiment of the invention, the aforesaid intermediate part of the conduit structure is represented by the chamber 29, from the upper portion of which extends horizontally the passage 31 that communicates with the conduit 13, the lower portion of said chamber communicating with said downwardly directed conduit 12, viewed as a tangible part, said chamber is represented by the fitting 29 of inverted L shape shown in Fig. 2, having an upper horizontal limb that communicates with the conduit 13, and a lower, downwardly directed limb that communicates with the pipe 12.

I claim:

1. A control valve comprising a casing having a vertical bore interrupted in its continuity by an annular chamber enlarging the diameter of said bore intermediate its ends thereby forming thereabove and therebelow upper and lower portions of said bore which are substantially equal in diameter, said lower portion constituting a liquid containing cup the mouth of which opens into the lower part of said annular chamber, there being a delivery passage leading from one side of said annular chamber, a water supply nozzle located axially within said bore and upstanding from the bottom of said cup to a point above the mouth thereof, the upper end of said nozzle constituting a valve seat, a plunger slidably fitted within said upper portion of said bore, said plunger being axially bored out from its lower end throughout the greater portion of its length by an internal bore of substantially uniform diameter, a valve closure member located in the upper end of said internal bore engageable with said valve seat to cooperatively close the valve, said plunger having a reduced, substantially uniform external diameter extending upwardly part way from its lower end thereby forming at its juncture with the upper portion of said plunger a laterally directed annular shoulder, the diametrically reduced portion of said plunger together with the surrounding wall of said lower portion of said vertical bore forming an external annular channel which said shoulder overhangs in all operative positions of said plunger, there being at all times an internal annular channel between the aforesaid nozzle and the adjacent wall of the bored out portion of said plunger surrounding it, said channels at all times communicating with each other, said annular shoulder approximately closing the upper end of said external annular channel when said valve closure member is seated, the resistance offered by said annular shoulder to the closing of the valve increasing as said shoulder approaches the mouth of said external annular channel and diminishing as the valve closure member rises.

2. A control valve comprising a casing having a vertical bore interrupted in its continuity by an annular chamber enlarging the diameter of said bore intermediate its ends thereby forming thereabove and therebelow upper and lower portions of said bore which are substantially equal in diameter, said lower portion constituting a liquid containing cup the mouth of which opens into the lower part of said annular chamber, there being a delivery passage leading from one side of said annular chamber, a water supply nozzle located axially within said bore and upstanding from the bottom of said cup, the upper end of said nozzle constituting a valve seat, a plunger slidably fitted within said upper portion of said bore, said plunger being axially bored out part way from its lower end thereby providing an internal bore of substantially uniform diameter, a valve closure member located in the upper end of said internal bore engageable with said valve seat to close the valve, said plunger having a reduced, substantially uniform external diameter extending upwardly part way from its lower end thereby forming at its juncture with the upper portion a laterally directed annular shoulder, the diametrically reduced portion of said plunger together with the surrounding wall of said lower portion of said vertical bore forming an external annular channel which said shoulder overhangs in all operative positions of said plunger, there being at all times an internal annular channel between the aforesaid nozzle and the adjacent wall of the bored out portion of said plunger surrounding it, said channels at all times communicating with each other, said annular shoulder approximately closing the upper end of said external annular channel when said valve closure member is seated, the resistance offered by said annular shoulder to the closing of the valve increasing as said shoulder approaches the mouth of said external annular channel and diminishing as the valve closure member rises.

ALEXANDER BERENY.